United States Patent [19]
Giles et al.

[11] Patent Number: 5,978,119
[45] Date of Patent: Nov. 2, 1999

[54] SYSTEM AND METHOD FOR SYNCHRONIZING AN OPTICAL SOURCE AND A ROUTER IN A WAVELENGTH DIVISION MULTIPLEXED FIBER OPTIC NETWORK

[75] Inventors: Clinton Randy Giles, Morganville; Song Jiang, Whippany, both of N.J.

[73] Assignee: Lucent Technologies Inc., Murray Hill, N.J.

[21] Appl. No.: 08/802,809

[22] Filed: Feb. 18, 1997

[51] Int. Cl.[6] .................................................. H04J 14/02
[52] U.S. Cl. .......................... 359/132; 359/127; 359/130; 359/133; 359/187; 372/23
[58] Field of Search .................................... 359/124, 125, 359/127, 128, 129, 130, 132, 133, 187; 372/23, 99, 100, 102, 107, 20, 32

[56] References Cited

U.S. PATENT DOCUMENTS

| | | | |
|---|---|---|---|
| 5,410,404 | 4/1995 | Kersey et al. | 356/345 |
| 5,428,635 | 6/1995 | Zhiglinsky et al. | 372/102 |
| 5,450,427 | 9/1995 | Fermann et al. | 372/102 |
| 5,467,418 | 11/1995 | Dragone | 385/37 |
| 5,469,520 | 11/1995 | Morey et al. | 385/37 |
| 5,691,989 | 11/1997 | Rakuljic et al. | 372/102 |

OTHER PUBLICATIONS

C.R. Giles et al., Access PON Using Downstream 1550–nm WDM Routing and Upstream 1300–nm SCMA Combining Through a Fiber–Grating Router, *IEEE Photonics Technology Letters*, vol. 8, No. 11, pp. 1549–1551 (Nov. 1996).

N.J. Frigo et al., RITE–Net: A Passive Optical Network Architecture Based on the Remote Interrogation of Terminal Equipment, OFC 1995, PD 8, pp. PD1–PD3 (Feb. 1995).

M. Zirngibl et al., LARNet, a Local Access Router Network, *IEEE Photonics Technology Letters*, vol. 7, No. 2, pp. 215–217 (Feb. 1995).

*Primary Examiner*—Leslie Pascal

[57] ABSTRACT

A system and method for maintaining alignment between a source and router in a Wavelength Division Multiplexed (WDM) fiber optic network. In a preferred embodiment, a narrow band of the wavelengths emitted by the WDM source is designated as a monitor channel. The monitor channel is matched in wavelength to a fiber grating that is located in the optical path between the source and router so that the grating reflects the monitor channel light while allowing all other source light to pass through unimpeded. By monitoring the reflected light and adjusting the source wavelengths to maximize the amount of reflected light, alignment between the source and router is maintained.

28 Claims, 5 Drawing Sheets

SYSTEM AND METHOD FOR SYNCHRONIZING AN OPTICAL SOURCE AND A ROUTER IN A WAVELENGTH DIVISION MULTIPLEXED FIBER OPTIC NETWORK

FIELD OF THE INVENTION

This invention relates to fiber optics, and more particularly to wavelength division multiplexed fiber optic networks.

BACKGROUND OF THE INVENTION

A common type of fiber optic network is the Wavelength Division Multiplexed (WDM) network. In a typical WDM network, a multifrequency source is used to generate two or more signals of distinct wavelengths. A single fiber is used to carry the signals to a remote router where they are distributed to network subscribers according to their wavelengths. Similarly, in networks which provide for two-way signaling, the router may be used to combine signals generated by the subscribers.

To maximize the efficiency of a WDM network, the router must accurately track the source wavelengths. The router is essentially a comb filter which, ideally, has its lobes centered on the source signal wavelengths. Accordingly, when the lobes of the router are not aligned with the source wavelengths the router will attenuate the signals intended for the subscribers, the level of attenuation being proportional to the amount of misalignment between the source and the router. Moreover, misalignment of the source and router can result in crosstalk between router outputs, decreasing performance even further. Misalignment may occur, for example, when a temperature change at the source causes the source frequencies to drift or, similarly, when a temperature change at the router causes the router filter bands to drift.

In an attempt to eliminate misalignment between sources and routers network designers have proposed loopback WDMs. In a loopback system, a portion of the signal received by a subscriber is fed back, via a separate feedback fiber, to a central station. The power level of the feedback signal is examined. Any misalignment between the source and router shows up as a drop-off in the power level of the feedback signal and realignment may be achieved by adjusting the source wavelengths to maximize the feedback signal. Such a system, however, requires a separate fiber line to provide the feedback to the central station, and therefore the overall cost of a network employing the system is increased.

SUMMARY OF THE INVENTION

In a WDM network according to the present invention the feedback necessary to maintain alignment between a WDM source and a WDM router is provided without employing a loopback fiber.

In a preferred embodiment of the invention, a narrow band of the wavelengths emitted by the source is designated as a monitor channel. The monitor channel is matched in wavelength to a fiber grating that is located in the optical path between the source and the router. The grating is designed to reflect all light of the monitor channel wavelength while allowing all other source wavelengths to pass through unimpeded. Preferably, the grating is located in close proximity to the router so that any environmentally induced wavelength drift that is experienced by the router will also be experienced by the grating. In this manner, the drift in the grating tracks the drift in the router.

Under normal operating conditions the monitor channel and fiber grating remain in wavelength alignment with each other and the amount of reflected monitor channel light is at its peak value. However, if an environmental disturbance causes the source and grating to fall out of alignment the amount of reflected monitor channel light is less than the peak value, the decrease in reflected light being proportional to the misalignment between the source and grating. Since the grating tracks the router, the decrease in reflected light is also proportional to the misalignment between the source and router. Thus, the decrease in reflected light can be used as an error signal that indicates the amount of misalignment between the source and router. This error signal is fed back to the WDM source for the purpose of adjusting the source wavelengths to compensate for the misalignment.

DETAILED DESCRIPTION

Figure 1:
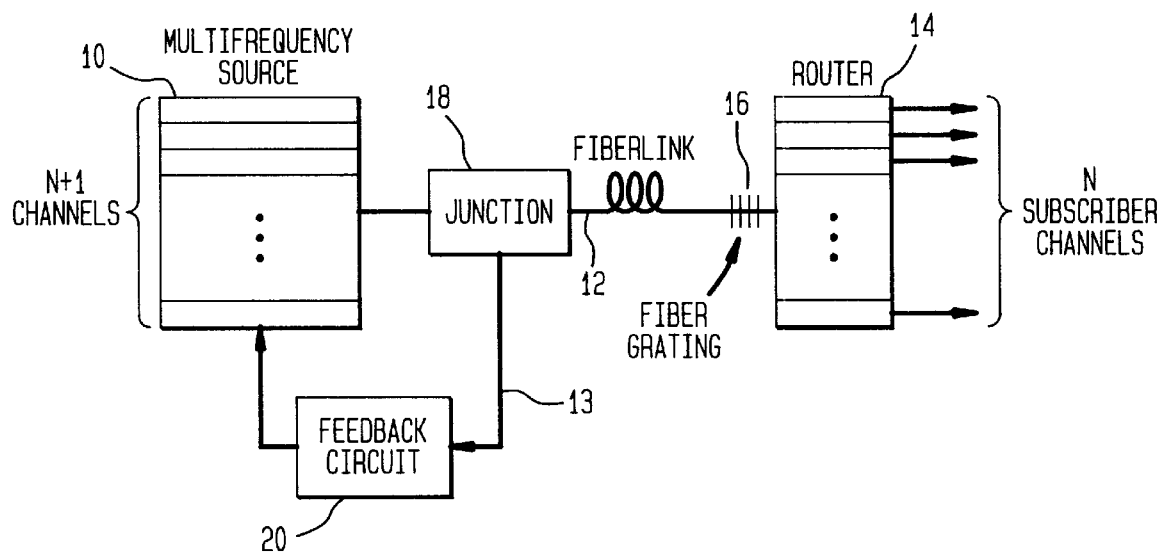
FIG. 1 is a block diagram of a Wavelength Division Multiplexed (WDM) fiber optic system in accordance with a preferred embodiment of the invention.

FIG. 1 is a block diagram of a Wavelength Division Multiplexed (WDM) fiber optic system in accordance with a preferred embodiment of the invention. As can be seen from the figure, the WDM system includes a multifrequency source 10 which is capable of generating source light in N+1 different wavelength bands (or "channels"). There are many types of multifrequency sources which can be used with the invention. For example, multifrequency source 10 may be a multifrequency laser in the form of an integrated distributed feedback array. Alternatively, source 10 may be made up of several individual lasers, each transmitting within a distinct wavelength band.

In any event, the source light bands are combined for transmission through an optical fiber link 12 which guides the light to a WDM router 14. An optical junction 18 is located in the optical path between the source and fiber for a purpose to be described below. With regard to light emanating from the source toward fiber 12, junction 18 allows all such light to pass through to the router and directs little or no light into fiber 13. Once at the router, the light bands allocated for use by network subscribers are uncombined for reception by the subscribers.

Of the N+1 channels, as many as N channels are designated for use by network subscribers. These channels are termed "subscriber channels". Each one of the subscriber channels is used to carry optical transmissions to a particular network subscriber, and therefore the source light for a particular subscriber channel is modulated according to the information intended for reception by the subscriber assigned to that channel. The remaining one or more channels are designated as monitor channels. (For purposes of illustration only single monitor channel systems will be considered hereafter.)

The monitor channel is not intended for reception by network subscribers, but rather, is used to maintain wavelength alignment between the multifrequency source and the router. Referring back to FIG. 1, the monitor channel is matched in wavelength to a fiber grating 16 that is located in the optical path between the source and the router. The grating is designed to reflect all light of the monitor channel wavelength while allowing light of all other source wavelengths to pass through unimpeded. Preferably, the grating is located in close proximity to the router so that any environmentally induced wavelength drift that is experienced by the router will also be experienced by the grating. In this manner, the drift in the grating tracks the drift in the router.

Under normal operating conditions the monitor channel and fiber grating remain in wavelength alignment with each other and the amount of reflected monitor channel light is at its peak value. However, if an environmental disturbance causes the source and grating to fall out of alignment the amount of reflected monitor channel light is less than the peak value, the decrease in reflected light being proportional to the misalignment between the source and grating. Since the grating tracks the router, the decrease in reflected light is also proportional to the misalignment between the source and router. Thus, the decrease in reflected light can be used as an error signal that indicates the amount of misalignment between the source and router. This error signal is fed back to the WDM source for the purpose of adjusting the source wavelengths to compensate for the misalignment.

Upon reflection by the fiber grating, monitor channel light is guided back toward the multifrequency source by the fiber link until it reaches tap 18. The tap, e.g. a directional coupler, directs the reflected light into fiber 13 which, in turn, directs the reflected light to a feedback circuit 20. The feedback circuit's function is to maximize the reflected light through adjustment of the source wavelengths. To achieve high dynamic range in the feedback circuit synchronous detection (or "lock-in) techniques may be employed.

An important consideration in the FIG. 1 system, and in the invention in general, is the reflection characteristics of the fiber grating. An ideal grating reflects 100% of the monitor channel light while allowing 100% of the subscriber channel light to pass through unimpeded. Practical gratings, on the other hand, will allow some monitor channel light to pass and will reflect some subscriber channel light.

Figure 2A:
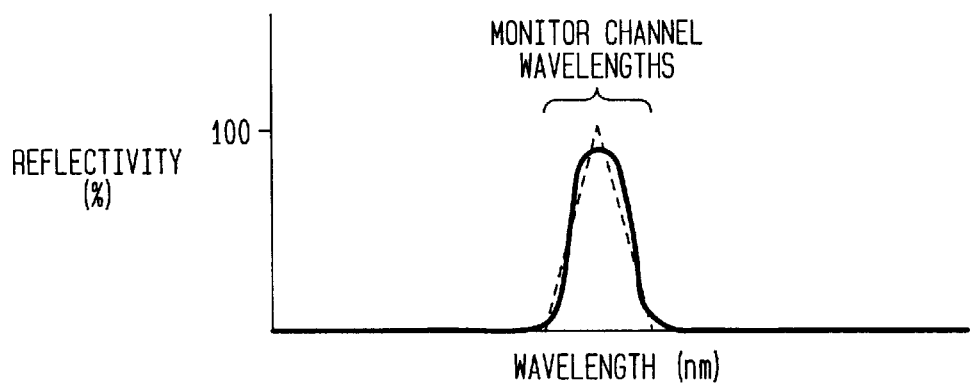
FIGS. 2A–2C show examples of reflectivity characteristics that may be realized through fiber gratings.
Figure 2B:
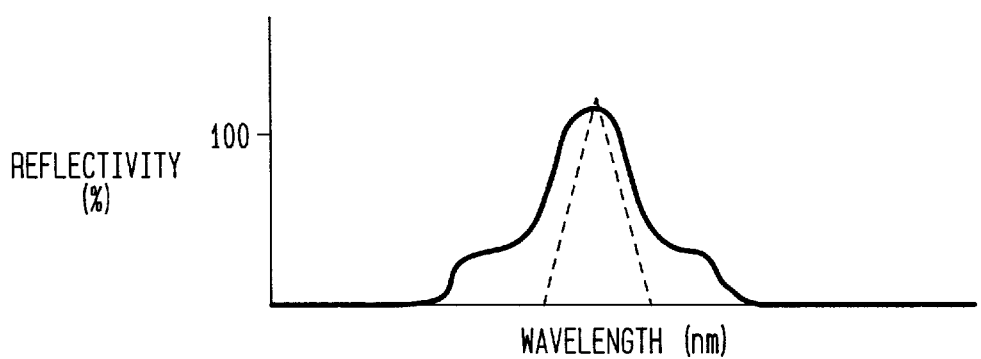
Figure 2C:
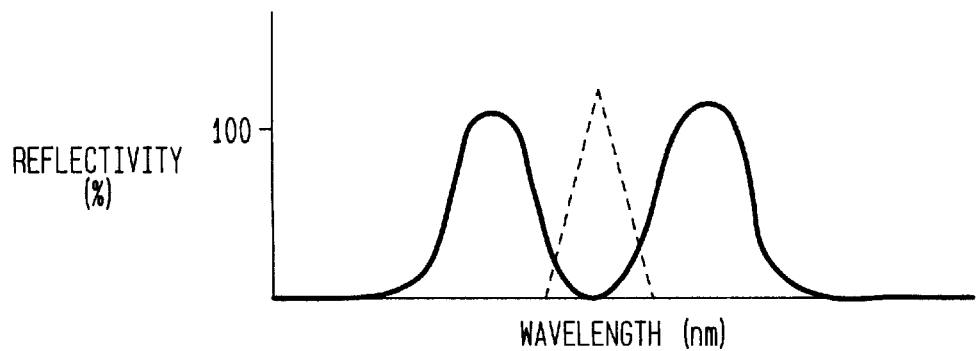

FIGS. 2A–2C illustrate reflectivity characteristics of fiber gratings that may be used with the invention. The horizontal axis in the figures represents wavelength in nanometers and the vertical axis represents reflectivity in percent. FIG. 2A shows the reflectivity characteristic of a narrowband grating. Superimposed on the curve, and indicated by a dotted line, is an idealized reflectivity characteristic. FIG. 2B shows the characteristic of a grating having high reflectivity at the center of its band and lower reflectivity at the perimeter of its band. This characteristic may be alternatively realized by combining two gratings, a narrowband grating having high reflectivity and a broadband grating having lower reflectivity. FIG. 2C shows the reflectivity characteristic of a grating filter having a null in its center. This characteristic may be alternatively realized by combining two narrowband gratings having offset wavelengths. When this type of filter shape is employed the feedback circuit locks on to the null rather than the peak.

Another important consideration in the invention is how environmental drift in the source (rather than the router) affects performance. In this regard, it is noted that the invention will compensate for environmental drift in the source in the same manner that it compensates for drift in the router. As discussed above, drift in the router wavelength causes a decrease in reflected monitor channel light. Likewise, a drift in the source wavelengths causes a decrease in reflected monitor channel light. Regardless of the source of the decrease the feedback circuit will attempt to compensate for it, and therefore drift in the source is handled in the same way that drift in the router is handled.

It is also important to note that for the drift compensation to work with maximum effectiveness it is necessary for all the source wavelengths (including the monitor channel) to drift together as a comb of wavelengths. That is, for maximum effectiveness all the source wavelengths must drift the same amount. Under such conditions the monitor channel drift compensation, as determined through the error signal, is precisely the amount of compensation necessary for the source channels, thereby allowing for optimum source channel compensation. However, if the drift in one or more of the source channels is different from the drift in the monitor channel, the compensation as applied to those channels is somewhat less than optimum. The greater the difference between the drift in a particular source channel and the drift in the monitor channel, the less effective the compensation for that source channel.

Often, the amount a channel drifts is dependent on its frequency. In the FIG. 1 system, for example, the highest frequency channel may drift a given amount, the second highest frequency channel a little less, the third highest frequency channel even less, and so on. In such a system, the maximum amount of difference between monitor channel drift and source channel drift may be minimized by selecting the monitor channel from a channel situated at or near the center of the frequencies spanned by the N+1 channels. Although the monitor channel may be chosen from any of the N+1 channels, choosing it towards the center ensures that it will drift by an amount that is halfway (or about halfway) between the drifts experienced by the outerlying source channels.

Figure 3:
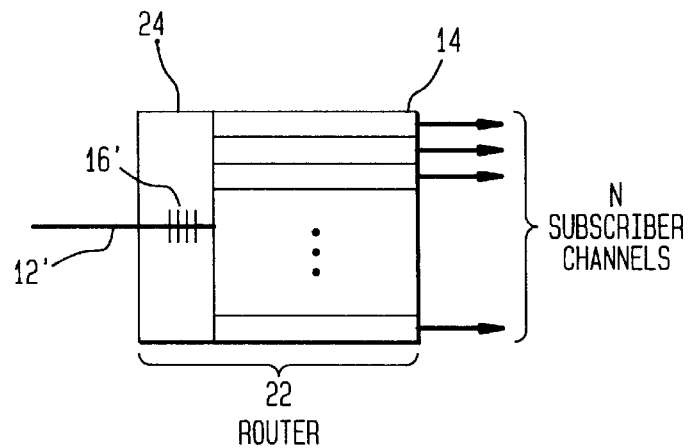
FIG. 3 is a block diagram of an alternative Wavelength Division Multiplexed (WDM) router suitable for use in a preferred embodiment of the invention.

FIG. 3 shows an alternative Wavelength Division Multiplexed (WDM) router 22 suitable for use in a preferred embodiment of the invention. The router is coupled to a fiber link 12' via an input port 24. The fiber link is analogous to link 12 in FIG. 1 and, like link 12, it is the optical path through which the router is coupled to a multifrequency source. The input port includes a fiber grating 16'. Grating 16' performs the same function as grating 16 of FIG. 1.; however, by writing the grating directly into the router the need for a separate fiber grating is obviated and the environmental coupling between the grating and router is improved. The improved coupling provides for better environmental tracking between the grating and router, and therefore improves overall system performance.

Figure 4:
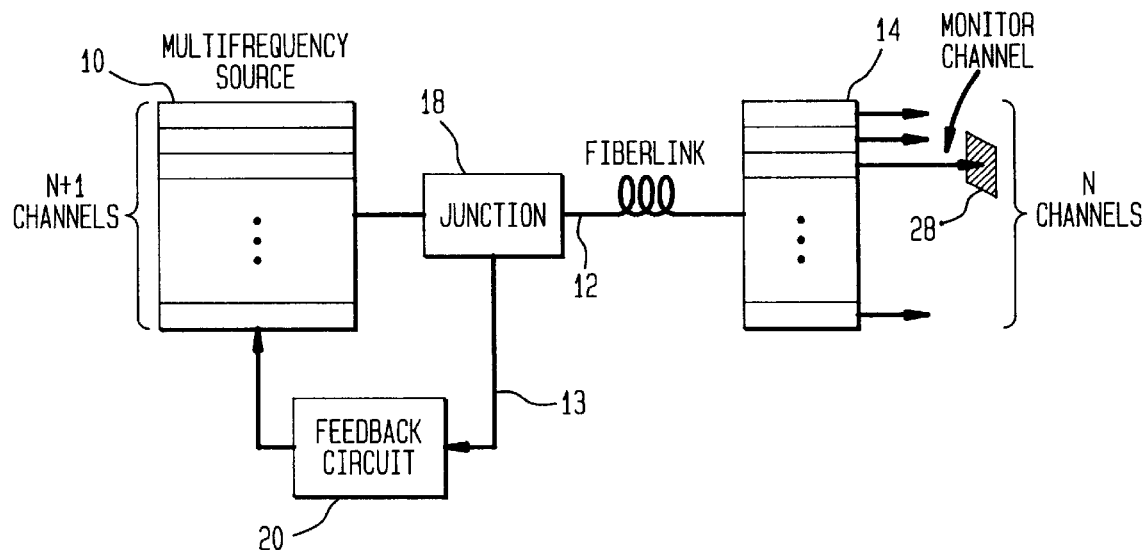
FIG. 4 is a block diagram of a Wavelength Division Multiplexed (WDM) fiber optic system in accordance with an alternative embodiment of the invention.

FIG. 4 shows another alternative embodiment of the invention. Any element that appears in both FIGS. 1 and 4 performs the same function in both embodiments and is assigned the same reference numeral. Accordingly, the multifrequency laser 10 of FIG. 4, like the laser of FIG. 1, generates source light in N+1 different wavelength bands, one of which is used as a monitor channel. The source light that is intended for subscribers is distributed to the subscribers through fiber link 12 in combination with WDM router 24. Furthermore, the monitor channel light is reflected back toward the multifrequency laser and is redirected toward the feedback control circuit 20 by tap 18. The feedback control circuit uses information gleaned from the monitor channel to maintain alignment of the source and router.

However, unlike the FIG. 1 embodiment, the FIG. 4 embodiment does not include a fiber grating for the purpose of selectively reflecting the monitor channel light from within the combined source light. Instead, the monitor channel light is reflected after it has passed through the router and been separated from the subscriber channel light. As shown in the figure, this may be done by placing a reflector 28 in the path of the router output corresponding to the monitor channel.

When comparing the FIG. 4 embodiment to the other presented embodiments two important distinctions should be noted. First, in the FIG. 4 embodiment the monitor channel light passes through the router, and is therefore attenuated due to the fiber/router coupling loss. The attenuation is exacerbated by the fact that the monitor channel light takes a round trip through the router, once upon transmission from the source and once upon reflection toward the feedback circuit. By contrast, in the FIG. 1 embodiment, the monitor channel light need not pass through the router at all, and thus is not affected by the fiber/router coupling loss. Accordingly, in applications where the level of monitor channel light is critical, the FIG. 1 embodiment is preferred. Second, in the FIG. 4 embodiment, the monitor channel occupies one of the router outputs, thereby reducing the number of router outputs that can be used to service subscribers. By contrast, in the FIG. 1 embodiment, the monitor channel does not have to pass through the router and may therefore be selected to lie between router channels. In this manner the monitor channel does not interfere with full utilization of the router.

An experiment was conducted to test the FIG. 1 embodiment and demonstrate the viability of the invention. For purposes of the test, the error signal returned by fiber grating 16 was measured but not used to adjust the multifrequency source's wavelengths. Instead, the source wavelengths were adjusted through temperature tuning. The test is described in more detail below.

The multifrequency source used in the test was a 24 channel integrated-optic multifrequency laser. The light emitted from the laser was in the 1555 nm wavelength region with 100 GHz channel spacing and a total fiber/junction output power of −9.90 dBm. The laser was used to generate 7 subscriber channels having 200 GHz channel spacing. The channels were modulated with 50 Mb/s pseudorandom Nonreturn-to-Zero (NRZ) data.

Figure 5:
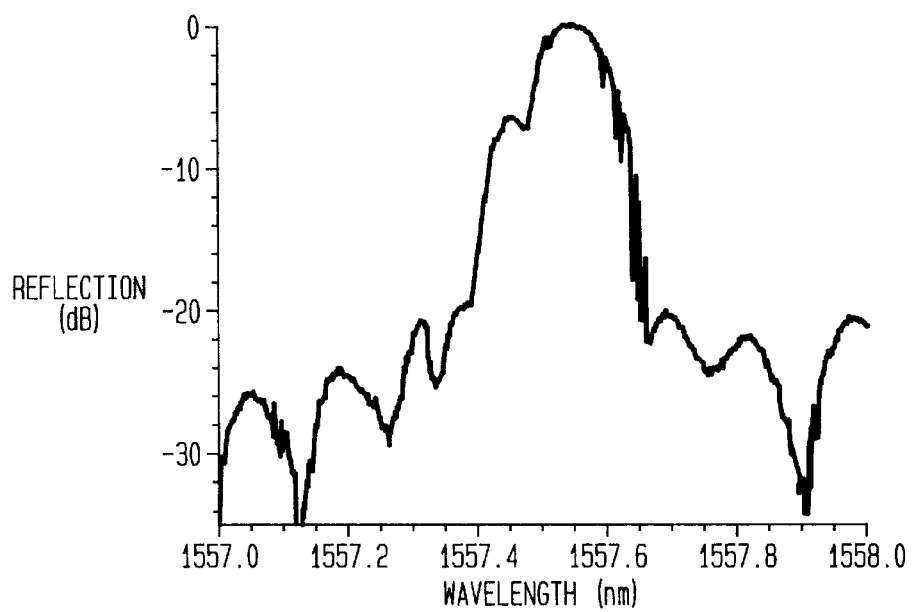
FIG. 5 is a graph depicting the reflection characteristic of a fiber grating used in a test embodiment of the invention.
Figure 6:
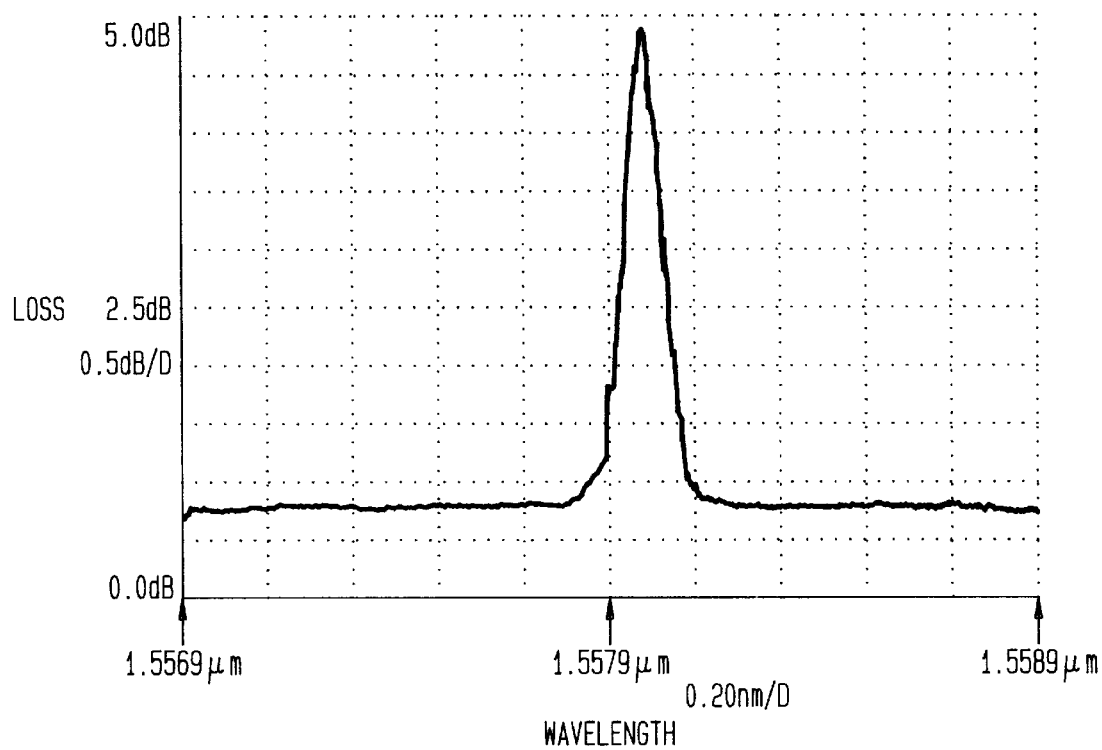
FIG. 6 is a graph depicting the transmission characteristic of a fiber grating used in a test embodiment of the invention.

The fiber link used for the test was a 6.3 km link made of 5 connectorized sections. The link was coupled to a fiber grating having a 13.6 GHz, 3 dB reflection bandwidth centered at 1557.0 nm (Temperature=20° C.). The grating's reflection characteristic and transmission characteristic are shown in FIGS. 5 and 6, respectively.

Figure 7:
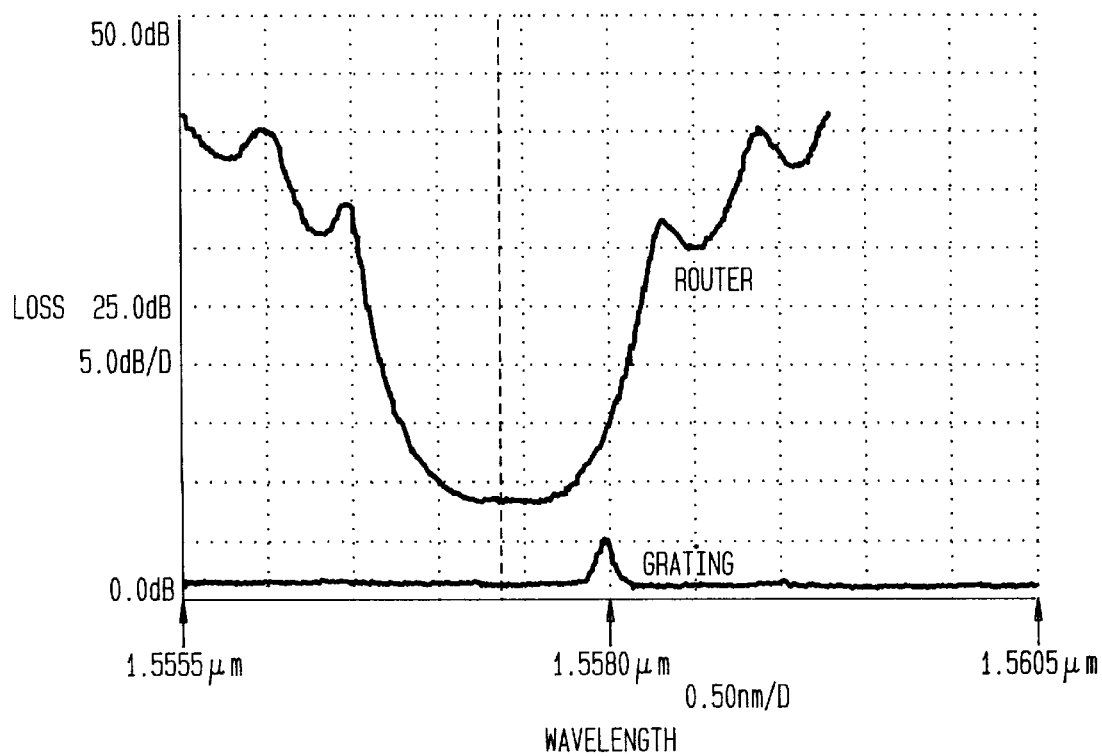
FIG. 7 is a graph depicting router transmission vs. grating transmission for a test embodiment of the invention.

The router used in the experiment was an 8 channel arrayed-waveguide grating router with 200 GHz channel spacing and 8.9 dB average insertion loss. The router was coupled to the fiber grating's output, and both the router and grating were placed inside a temperature controlled oven. During the test the router's output ports were left unterminated to simulate a worst-case condition. The transmission characteristic of the router as compared to that of the grating is shown in FIG. 7. As can be seen from the figure, the fiber grating wavelength is offset from the wavelength of the nearest router channel by about 0.6 nm (Temperature =19.3° C.).

Figure 8:
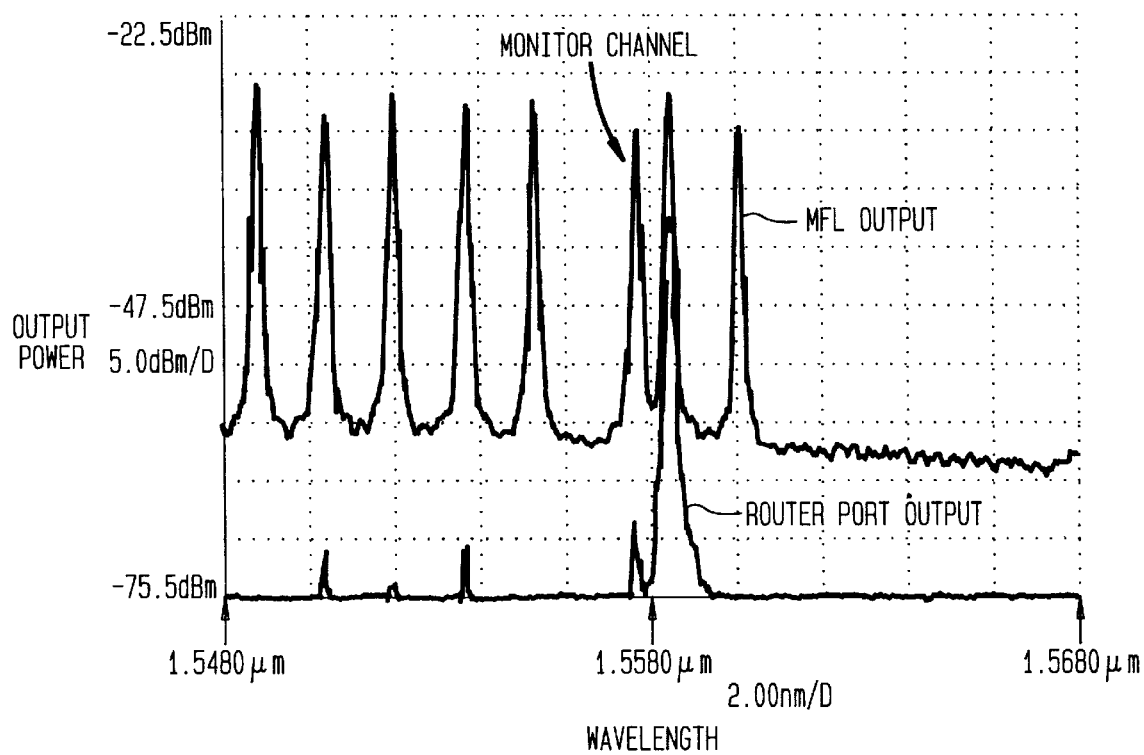
FIG. 8 is a graph depicting multifrequency source output vs. router port output for a test embodiment of the invention.

The monitor channel for the test was chosen to be in the region of 1558 nm. It was spaced 100 GHz from the nearest subscriber channel. The overall frequency plan of the multifrequency laser is shown in FIG. 8. Also shown, is the output of the router port that is closest to the monitor channel in wavelength. As can be seen, there is no significant interference between the monitor channel and the router port output.

The results of the test are documented in Table I. The Normalized Router Output measurements shown in the table were taken from the router port closest to the monitor channel in wavelength. The following test procedure was invoked.

TABLE I

| Temperature of Router and Grating (° C.) | Temperature of Multifrequency Laser (° C.) | Normalized Router Output (dB) | Error Signal (uV) | Channel Wavelength (nm) |
| --- | --- | --- | --- | --- |
| 19.3 | 14.5 | 0.0 | 42.5 | 1558.65 |
| 73.0 | 14.5 | −8.6 | 0.9 | 1558.65 |
| 73.0 | 19.3 | +0.5 | 35.5 | 1559.22 |

First, the router and grating were stabilized at room temperature (19.3° C.) and the multifrequency laser was temperature tuned to obtain the maximum error signal. As noted from line 1 of the table, a maximum error signal of 42.5 uV was achieved at a multifrequency laser temperature of 14.5° C. and a monitor channel wavelength of 1558.65 nm. The router output under these conditions was used as a reference for the remainder of the test, and thus the Normalized Router Output for line 1 of the table is 0 dB.

Next, the temperature of the oven was increased to 73.0° C. so that the router and grating would attain a temperature of 73.0° C. This resulted in the loss of both the router output signal and the error signal (line two of the table). Finally, the error signal was reestablished by increasing the multifrequency laser temperature from 14.5° C. to 19.3° C. As the error signal was reestablished the Normalized Router Output was restored (line three of the table). Thus, by temperature tuning the source according to the monitor channel feedback, alignment was achieved between the source and the router output closest to the monitor channel in wavelength. Moreover, since the source was a multifrequency laser alignment between the source and the router output closest to the monitor channel resulted in alignment between the source and all other router outputs. Thereby, demonstrating that wavelength alignment between the source and router may be maintained by observing the monitor channel reflection and adjusting the source accordingly.

While the best mode for carrying out the invention has been described in detail, those familiar with the art to which the invention relates will recognize various alternative designs and embodiments for practicing the invention as defined by the following claims.

We claim:

1. A system for maintaining wavelength alignment between an optical source and router, wherein the source generates source light that is made up of light at a plurality of source wavelengths, comprising:

a) reflecting means located in a substantially straight optical path between the source and router, said reflecting means selectively reflecting source light at one or more of the source wavelengths while allowing light at the remaining source wavelengths to pass through unimpeded; and b) means for monitoring the amount of said reflected light and adjusting the source wavelengths to maximize the amount of said reflected light.

2. The invention of claim 1, wherein said reflecting means is located within an input port of the router.

3. The invention of claim 1, wherein said reflecting means comprises a fiber grating that is written into the router.

4. The invention of claim 1, wherein the optical path between the source and router comprises an optical fiber.

5. The invention of claim 4, wherein said reflecting means comprises a fiber grating that is written into said optical fiber.

6. The invention of claim 1, wherein said means for monitoring and adjusting comprises a synchronous detector.

7. A method for maintaining wavelength alignment between an optical source and router, wherein the source generates source light that is made up of light at a plurality of source wavelengths, comprising the steps of:

a) providing a reflecting means in a substantially straight optical path between the source and router for selectively reflecting source light at one or more of the source wavelengths while allowing light at the remaining source wavelengths to pass through unimpeded;

b) monitoring the amount of said reflected light; and c) adjusting the source wavelengths to maximize the amount of said reflected light.

8. A system for maintaining wavelength alignment between an optical source and router, wherein the source generates source light that is made up of light at a plurality of source wavelengths, comprising:

a) reflecting means located in a substantially straight optical path between the source and router, said reflecting means selectively reflecting source light at one or more of the source wavelengths while allowing light at the remaining source wavelengths to pass through unimpeded; and b) means for monitoring said reflected light and adjusting the source wavelengths according to a null in said reflected light so that the source remains in wavelength alignment with said reflecting means.

9. The invention of claim 8, wherein said reflecting means is located within an input port of the router.

10. The invention of claim 8, wherein said reflecting means comprises a fiber grating that is written into the router.

11. The invention of claim 8, wherein the optical path between the source and router comprises an optical fiber.

12. The invention of claim 11, wherein said reflecting means comprises a fiber grating that is written into said optical fiber.

13. The invention of claim 8, wherein said means for monitoring and adjusting comprises a synchronous detector.

14. A method for maintaining wavelength alignment between an optical source and router, wherein the source generates source light that is made up of light at a plurality of source wavelengths, comprising the steps of:

a) providing a reflecting means in a substantially straight optical path between the source and router for selectively reflecting source light at one or more of the source wavelengths while allowing light at the remaining source wavelengths to pass through unimpeded;

b) monitoring said reflected light; and c) adjusting the source wavelengths according to a null in said reflected light so that the source remains in wavelength alignment with said reflecting means.

15. A system for maintaining wavelength alignment between an optical source and router, wherein the source generates source light that is made up of light at a plurality of source wavelengths, comprising:

a) reflecting means located in the optical path at the output of the router, said reflecting means reflecting source light at one or more of the source wavelengths back through the router toward the source; and b) means for monitoring the amount of said reflected light and adjusting the source wavelengths to maximize the amount of said reflected light.

16. The invention of claim 15, wherein said reflecting means is a broadband reflector.

17. The invention of claim 15, wherein the optical path between the source and router comprises an optical fiber.

18. The invention of claim 15, wherein said means for monitoring and adjusting comprises a synchronous detector.

19. A method for maintaining wavelength alignment between an optical source and router, wherein the source generates source light that is made up of light at a plurality of source wavelengths, comprising the steps of:

a) providing a reflecting means in the optical path at the output of the router, said reflecting means reflecting source light at one or more of the source wavelengths back through the router toward the source;

b) monitoring the amount of said reflected light; and c) adjusting the source wavelengths to maximize the amount of said reflected light.

20. A system for maintaining wavelength alignment between an optical source and router, wherein the source generates source light that is made up of light at a plurality of source wavelengths, comprising:

a) reflecting means located in the optical path between at the output of the router, said reflecting means reflecting source light at one or more of the source wavelengths back through the router toward the source; and b) means for monitoring said reflected light and adjusting the source wavelengths according to a null in said reflected light so that the source remains in wavelength alignment with said reflecting means.

21. The invention of claim 20, wherein said reflecting means is a broadband reflector.

22. The invention of claim 20, wherein the optical path between the source and router comprises an optical fiber.

23. The invention of claim 20, wherein said means for monitoring and adjusting comprises a synchronous detector.

24. A method for maintaining wavelength alignment between an optical source and router, wherein the source generates source light that is made up of light at a plurality of source wavelengths, comprising the steps of:

a) providing a reflecting means in the optical path at the output of the router, said reflecting means reflecting source light at one or more of the source wavelengths back through the router toward the source;

b) monitoring said reflected light; and c) adjusting the source wavelengths according to a null in said reflected light so that the source remains in wavelength alignment with said reflecting means.

25. A system for maintaining wavelength alignment between an optical source and router, wherein the source generates source light that is made up of light at a plurality of source wavelengths, comprising:

a) reflector located in a substantially straight optical path between the source and router, said reflector selectively reflecting source light at one or more of the source wavelengths while allowing light at the remaining source wavelengths to pass through unimpeded; and b) a feedback circuit which monitors the amount of said reflected light and adjusts the source wavelengths to maximize the amount of said reflected light.

26. A method for maintaining wavelength alignment between an optical source and router, wherein the source generates source light that is made up of light at a plurality of source wavelengths, comprising the steps of:

a) providing a reflector having a substantially straight optical path between the source and router for selectively reflecting source light at one or more of the source wavelengths while allowing light at the remaining source wavelengths to pass through unimpeded;

b) monitoring the amount of said reflected light; and c) adjusting the source wavelengths to maximize the amount of said reflected light.

27. A system for maintaining wavelength alignment between an optical source and router, wherein the source generates source light that is made up of light at a plurality of source wavelengths, comprising:

a) a reflector located in the optical path at the output of the router, said reflector reflecting source light at one or more of the source wavelengths back through the router toward the source; and b) a feedback circuit which monitors the amount of said reflected light and adjusts the source wavelengths to maximize the amount of said reflected light.

28. A method for maintaining wavelength alignment between an optical source and router, wherein the source generates source light that is made up of light at a plurality of source wavelengths, comprising the steps of:

a) providing a reflector in the optical path at the output of the router, said reflector reflecting source light at one or more of the source wavelengths back through the router toward the source;

b) monitoring the amount of said reflected light; and c) adjusting the source wavelengths to maximize the amount of said reflected light.

* * * * *